(12) United States Patent
Hong

(10) Patent No.: US 8,272,696 B2
(45) Date of Patent: Sep. 25, 2012

(54) HEIGHT CONTROL UNIT OF A HEADREST FOR A VEHICLE SEAT

(76) Inventor: Cheong Myung Hong, Goyang-si (KR)

( * ) Notice: Subject to any disclaimer, the term of this patent is extended or adjusted under 35 U.S.C. 154(b) by 240 days.

(21) Appl. No.: 12/695,388

(22) Filed: Jan. 28, 2010

(65) Prior Publication Data

US 2011/0031796 A1 Feb. 10, 2011

(30) Foreign Application Priority Data

Aug. 7, 2009 (KR) .................. 10-2009-0072884

(51) Int. Cl.
*A47C 1/10* (2006.01)
(52) U.S. Cl. .......................... 297/410; 297/391
(58) Field of Classification Search .............. 297/410, 297/391
See application file for complete search history.

(56) References Cited

U.S. PATENT DOCUMENTS

| | | | | |
|---|---|---|---|---|
| 4,923,250 A | * | 5/1990 | Hattori ........................... | 297/410 |
| 5,288,129 A | * | 2/1994 | Nemoto ........................ | 297/410 |
| 5,433,508 A | * | 7/1995 | Akima et al. ................. | 297/410 |
| 6,364,415 B1 | * | 4/2002 | Mori et al. ..................... | 297/410 |
| 6,543,852 B2 | * | 4/2003 | Mori .............................. | 297/410 |
| 7,232,187 B1 | * | 6/2007 | Sundararajan et al. ........ | 297/410 |
| 7,543,888 B2 | * | 6/2009 | Kuno ............................. | 297/353 |
| 7,770,978 B2 | * | 8/2010 | Kim et al. ..................... | 297/410 |
| 7,878,597 B2 | * | 2/2011 | Bokelmann et al. .......... | 297/410 |

* cited by examiner

*Primary Examiner* — David Dunn
*Assistant Examiner* — Erika Garrett
(74) *Attorney, Agent, or Firm* — Kirton McConkie; Evan R. Witt

(57) ABSTRACT

The present invention relates to a height control unit of a headrest for a vehicle seat, in which the height of the headrest may be simply controlled by the driving force of an electric motor. The height control unit of a headrest for a seat of a vehicle includes a bracket fixed to an inner frame of a seat back, an electric motor fixed on a side of the bracket, a lead screw axially supported at a lower end by a stopper plate so as to be driven forward or backward towards a lower part of the bracket via a reduction gear box by the electric motor, lifting rods standing on both sides between the bracket and the stopper plate, and a carrier provided with pockets opened upward on both sides so as to receive poles of the headrest and lifted or lowered by the guide of the lifting rods in a state where the lead screw is screw-coupled with the carrier, wherein the carrier has stoppers axially supported by pins so that the stoppers are alternatively released by the manipulation of a user in a state where the poles of the headrest are coupled, and has coil springs elastically supporting the stoppers with respect to the carrier.

1 Claim, 6 Drawing Sheets

HEIGHT CONTROL UNIT OF A HEADREST FOR A VEHICLE SEAT

BACKGROUND OF THE INVENTION

1. Field of the Invention

The present invention relates to a height control unit of a headrest for a seat of a vehicle, and more particularly to a height control unit of a headrest for a seat of a vehicle, in which the height of the headrest may be simply controlled by the driving force of an electric motor.

2. Description of the Related Art

FIG. 1 shows a perspective view of a vehicle seat for explaining a height control unit of a headrest for a vehicle's seat according to the present invention.

In general, a vehicle seat includes a seat part 10 and a seatback 20 as shown in FIG. 1, wherein the seatback is mounted with a headrest 30 for supporting the rear portion of the head of a passenger at an upper part.

The headrest 30 of the vehicle seat 100 is provided with lifting rods at both sides of a lower end of a cushion 31, wherein the headrest 30 is provided with guide holes and fixing elements for the lifting rods to control the protruded height of the headrest 30 according to the body type of the passenger.

In the above conventional unit for height control of a headrest has, however, a disadvantage that a passenger has to manipulate a fixing lever of a lifting rod fixing unit for releasing the fixed state of the lifting rod, pulling or pushing a cushion part to control the protruded height of the headrest and fixing the controlled state of the headrest by means of the fixing lever of the lifting rod fixing unit.

Further, parts such as the fixing lever of the lifting rod fixing unit and the like may be damaged in the process of the height control of the headrest.

SUMMARY OF THE INVENTION

Therefore, the present invention has been accomplished in order to resolve the above-mentioned disadvantages and any other problems, and an object of the present invention is to provide a height control unit of a headrest for a vehicle seat for simply controlling the height of a headrest mounted on an upper part of a seatback of a vehicle seat.

In order to accomplish the above objects, there is provided with a height control unit of a headrest for a seat of a vehicle, including a bracket fixed to an inner frame of a seat back, an electric motor fixed on a side of the bracket, a lead screw axially supported at a lower end by a stopper plate so as to be driven forward or backward towards a lower part of the bracket via a reduction gear box by the electric motor, lifting rods standing on both sides between the bracket and the stopper plate, and a carrier provided with pockets opened upward on both sides so as to receive poles of the headrest and lifted or lowered by the guide of the lifting rods in a state where the lead screw is screw-coupled with the carrier, wherein the carrier has stoppers axially supported by pins so that the stoppers are alternatively released by the manipulation of a user in a state where the poles of the headrest are coupled, and has coil springs elastically supporting the stoppers with respect to the carrier.

In a power headrest for a vehicle's seat according to the present invention, the headrest may be automatically lifted or lowered by the driving force of an electric motor so that the height of the headrest may be simply controlled, thereby promoting the convenience of passengers and improving the competitiveness of a vehicle.

BRIEF DESCRIPTION OF THE DRAWINGS

The objects, features and advantages of the present invention will be more clearly understood from the preferred embodiments in the following detailed description in conjunction with the accompanying drawings, in which.

DETAILED DESCRIPTION OF THE PREFERRED EMBODIMENT

Now, a power headrest for a vehicle's seat according to the present invention will be described in more detail with reference to the accompanying drawings.

Figure 1:
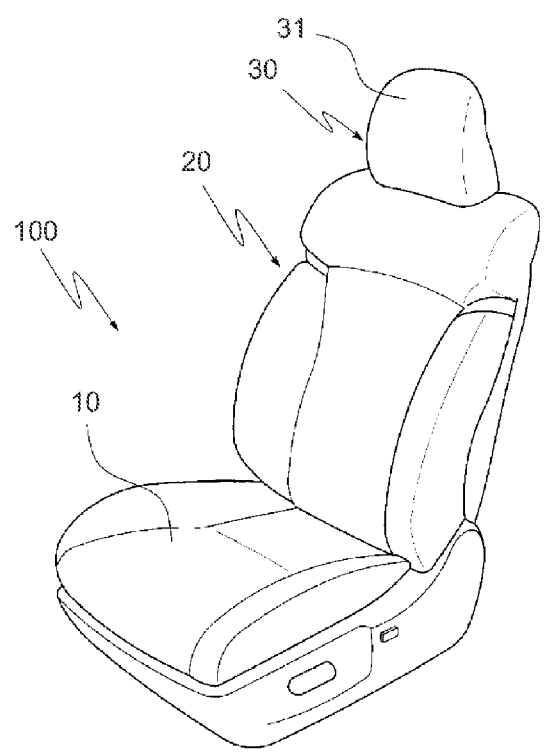
FIG. 1 is a perspective view of a typical vehicle seat for explaining a preferred embodiment of the present invention.
Figure 2:
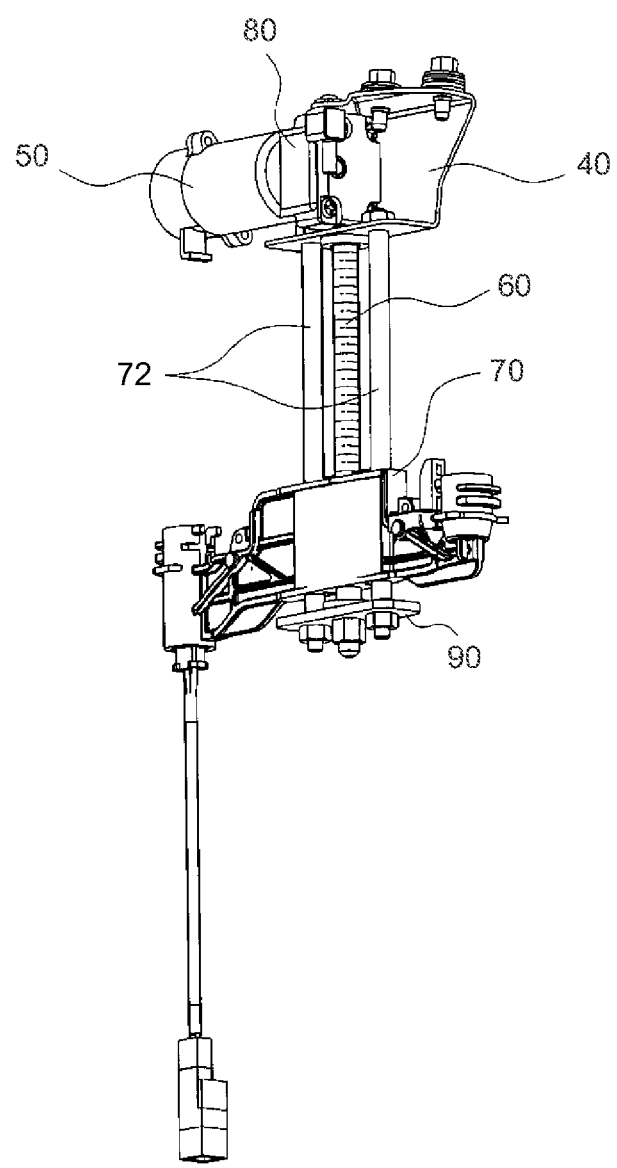
FIG. 2 is a perspective view showing principal parts of a height control unit for a headrest according to the preferred embodiment of the present invention.
Figure 3A:
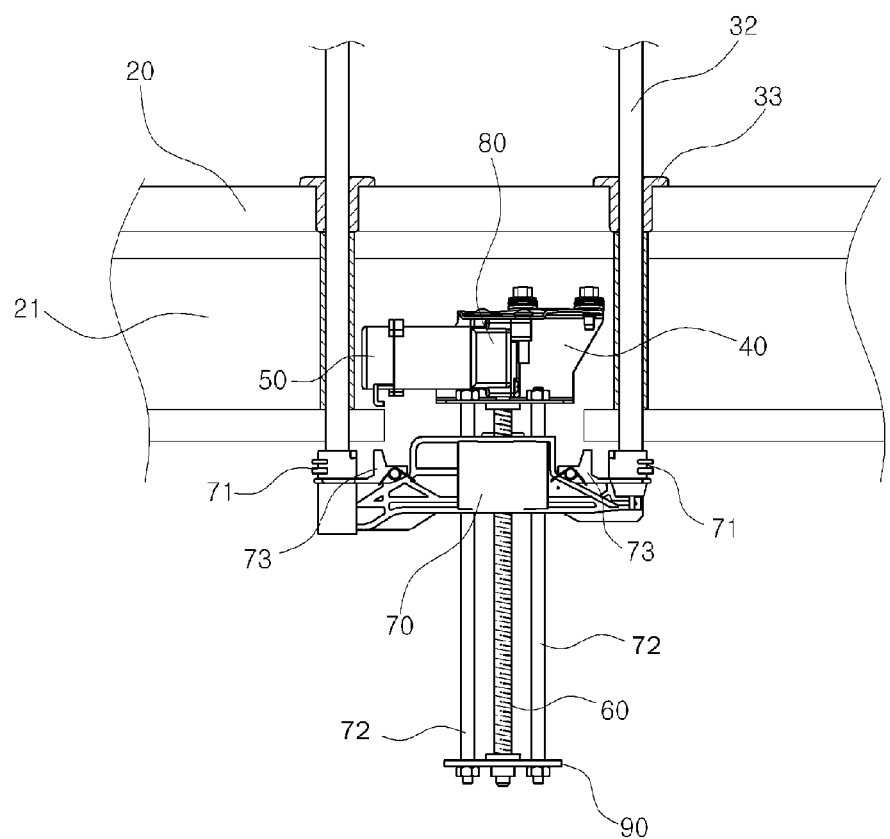
FIG. 3a and FIG. 3b are front views respectively showing the principal parts of the height control unit for a headrest according to the preferred embodiment of the present invention.
Figure 3B:
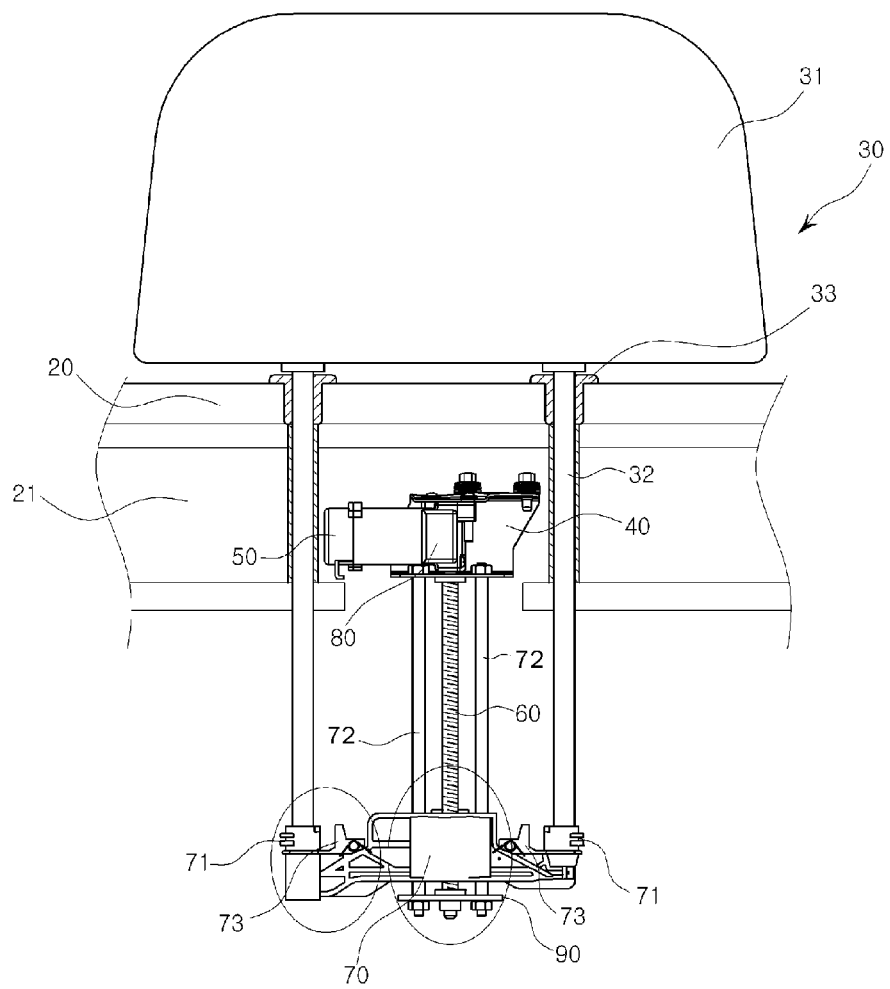
Figure 4:
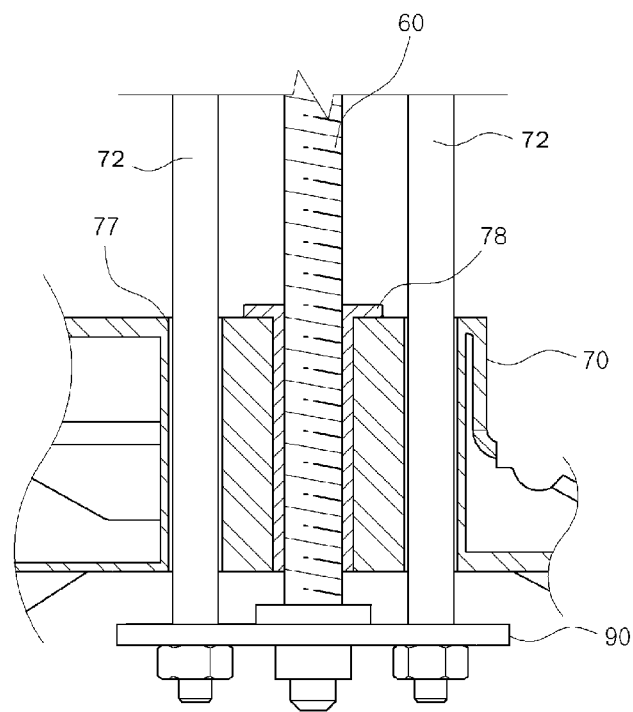
FIG. 4 is a cross-sectional view showing a state where a carrier is screw-coupled with a lead screw.
Figure 5:
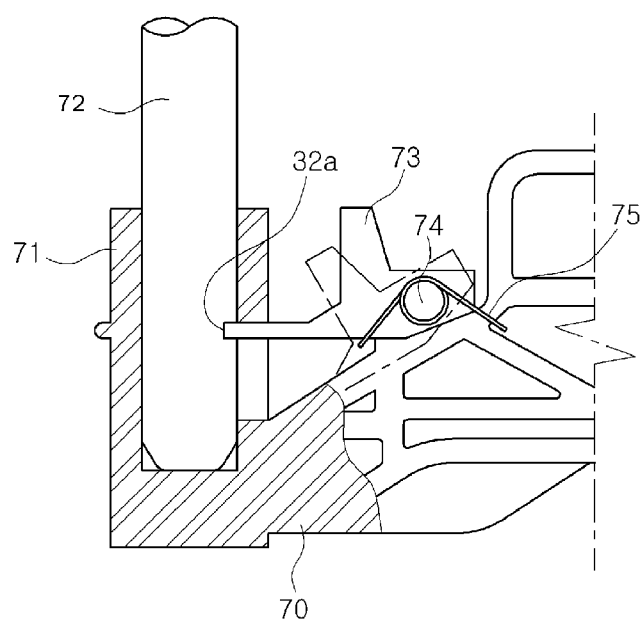
FIG. 5 is an expanded cross-sectional view showing the coupling state between a carrier and poles.

FIG. 2 is a perspective view showing principal parts of a power headrest for a vehicle's seat according to the preferred embodiment of the present invention, FIG. 3a and FIG. 3b are front views showing the principal parts, FIG. 4 is a cross-sectional view of principal parts to show the screw-coupling state between a carrier and a lead screw, and FIG. 5 is an expanded cross-sectional view showing engagement and release states between poles and stoppers mounted on the carrier.

In a typical headrest 30, two poles 32 at a lower part of a base cushion 31 are assembled into a seatback 20 as being connected to pole guides 33.

In this state, a driver or a passenger should control the height of the headrest 30 in the vertical direction according to his body conditions.

A frame 21 is provided in the seatback 20 for reinforcing the strength of the frame 21, wherein a bracket 40 according to the present invention is fixed at an upper part of the seatback 20 by using a bolt or carrying out welding.

An electric motor 50 is mounted at a side of the bracket 40 for rotating a lead screw 60 forward or backward via a reduction gear box 80.

The lead screw 60 is extended to the lower part of the bracket 40 so that an end of the lead screw is axially supported by a stopper plate 90, as shown in FIG. 2, wherein lifting rods 72 are stood at both sides of the lead screw 60 for guiding the lifting and lowering motion of a carrier 70 in the vertical direction.

A reduction gear box 80 converts the rotation direction of the electric motor 50 and reduces the rotation speed of the electric motor 50 for silent motion of the headrest 30.

The carrier 70 is provided with pockets 71 at both sides, wherein the pockets 71 are opened upward for receiving the poles 32 of the headrest so that the lower ends of the poles 32 of the headrest are fitted into the pockets, as shown in FIG. 3a and FIG. 3b.

The carrier 70 is formed with holes 77 at the positions corresponding to those of the lifting rods 72 so that the carrier 70 may be operated vertically without unintended motions through the guide of the lifting rods 72. Further, nuts 78 are screw-coupled with the lead screw 60 for preventing the abrasion of the lead screw 60.

In the carrier 70, stoppers 73 are axially supported by pins 74 so as to be alternatively released by the manipulation of a user in the state that the poles 32 of the headrest 30 are coupled, and coil springs 75 elastically support the stoppers 73 with respect to the carrier 70.

The pole 32 is formed with a holding shoulder 32a to be captured by the stopper 73.

In the power headrest for a vehicle's seat according to the present invention as constructed above, the carrier 70 is lifted in response to the rotation of the lead screw 60 in a direction, the lead screw 60 being screw-coupled with the nut 78 of the carrier 70 and connected to the electric motor 50, as a user manipulates a motor switch (not shown). Therefore, the poles 32 connected to the pockets 71 and the headrest 30 are simultaneously lifted for the height control of the headrest as desired.

If the electric motor 50 and the lead screw 60 are rotated in the opposite direction from the above situations in response to the manipulation of the motor switch, the positions of the carrier 70 screw-coupled with the lead screw 60, the poles 32 and the headrest 30 may be controlled to be lowered.

Although the present invention has been described in detail by reference to the forgoing embodiments and accompanying drawings, the present invention is not limited thereto and it is apparent to those skilled in the art that various changes and modifications of the present invention may be made without departing the spirit and scope of the invention.

What is claimed is:

1. A height control unit of a headrest for a vehicle seat comprising:
    a bracket fixed to an inner frame of a seat back;
    a motor fixed on a side of the bracket;
    a lead screw axially supported at a lower end by a stopper plate so as to be driven forward or backward towards a lower part of the bracket via a reduction gear box by the motor;
    lifting rods standing on both sides of the lead screw between the bracket and the stopper plate; and
    a carrier provided with pockets opened upward on both sides so as to receive poles of the headrest and lifted or lowered by the guide of the lifting rods in a state where the lead screw is screw-coupled with the carrier,
    wherein each pole comprises a holding shoulder and wherein the carrier has stoppers which engage the holding shoulders, wherein the stoppers are axially supported by pins that permit pivoting movement of the stoppers so that the stoppers are alternatively released from the holding shoulders by the manipulation of a user in a state where the poles of the headrest are coupled, and coil springs elastically support the stoppers with respect to the carrier.

* * * * *